Aug. 18, 1959   E. H. BADGER, JR., ET AL   2,900,165
GATE VALVE AND SEAL
Filed March 30, 1955   3 Sheets-Sheet 1

EVERETT H. BADGER, JR.
SAMUEL D. BURTON
INVENTORS

BY *Lyon r Lyon*

ATTORNEYS

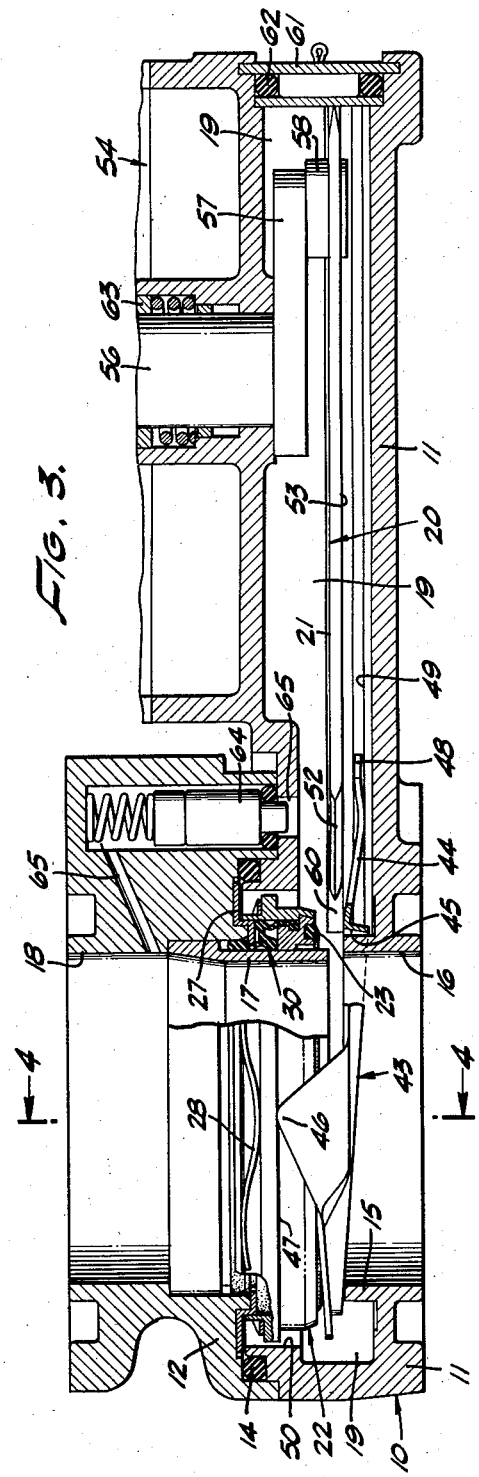
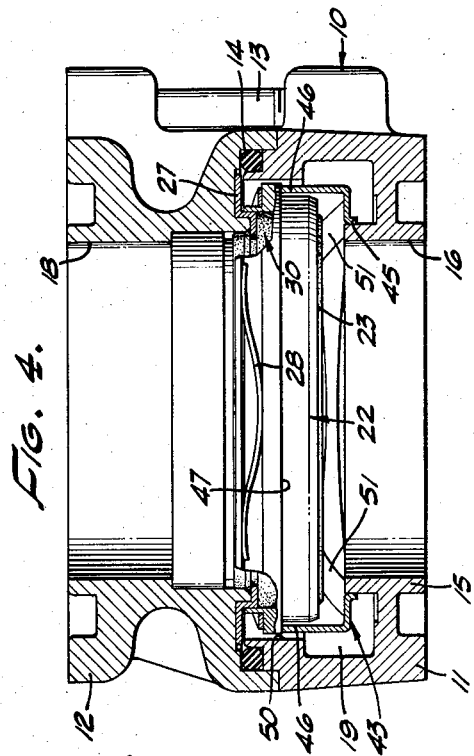
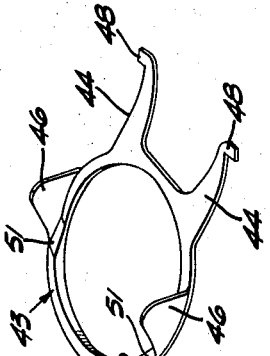
EVERETT H. BADGER, JR
SAMUEL D. BURTON
INVENTORS
ATTORNEYS Aug. 18, 1959 — E. H. BADGER, JR., ET AL — 2,900,165
GATE VALVE AND SEAL
Filed March 30, 1955 — 3 Sheets-Sheet 3

EVERETT H. BADGER, JR.
SAMUEL D. BURTON
INVENTORS

BY Lyon & Lyon
ATTORNEYS

United States Patent Office 2,900,165
Patented Aug. 18, 1959

2,900,165

GATE VALVE AND SEAL

Everett H. Badger, Jr., Whittier, and Samuel D. Burton, Los Angeles, Calif., assignors to Parker-Hannifin Corporation, Cleveland, Ohio, a corporation of Ohio Application March 30, 1955, Serial No. 497,934

4 Claims. (Cl. 251—172)

This invention relates to apparatus for controlling flow of fluids through conduits and is particularly directed to improvements in gate valve construction. This invention finds particular usefulness in gate valves of the type used in aircraft fuel systems.

Valves having a transversely moving gate commonly employ axially moving seals which seat against the side faces of the gate. It is desirable to move the seals out of contact with the gate when it is being moved to and from closed position. Furthermore, it is desirable to cause the seals to move into contact with the gate before the the gate reaches fully closed position in order to produce a small amount of scrubbing action between the seals and the gate surfaces.

It is an object of this invention to provide improved mechanism for moving the gate sealing means axially during transverse movement of the gate to and from closed position.

It is another object to provide a device of this type which operates effectively to seal against flow in either direction although employing seal means on only one side of the gate.

Another object is to provide a novel form of lift member for maintaining the seal means in retracted position, the lift member being contacted by the gate during its movement toward closed position to move the lift member to an inoperative position and thereby permit the seal means to become effective.

Another object is to provide an improved form of axially movable sealing device.

Another object is to provide such a sealing device which may be used either for slide valves or rotary valves, and which has the advantage that for a given minimum bore diameter through the assembly the diameter of the sealing ring which engages the movable valve element may be a minimum.

A more detailed object is to provide an improved form of diaphragm element for use in such a sealing assembly.

Other and more detailed objects and advantages will appear hereinafter.

In the drawings:

Figure 3 is a sectional elevation taken substantially on the lines 3—3 as shown in Figure 2.

Figure 4 is a transverse sectional view taken substantially on the lines 4—4 as shown in Figure 3.

Figure 8 is a perspective view of the lift member.

Figure 1:
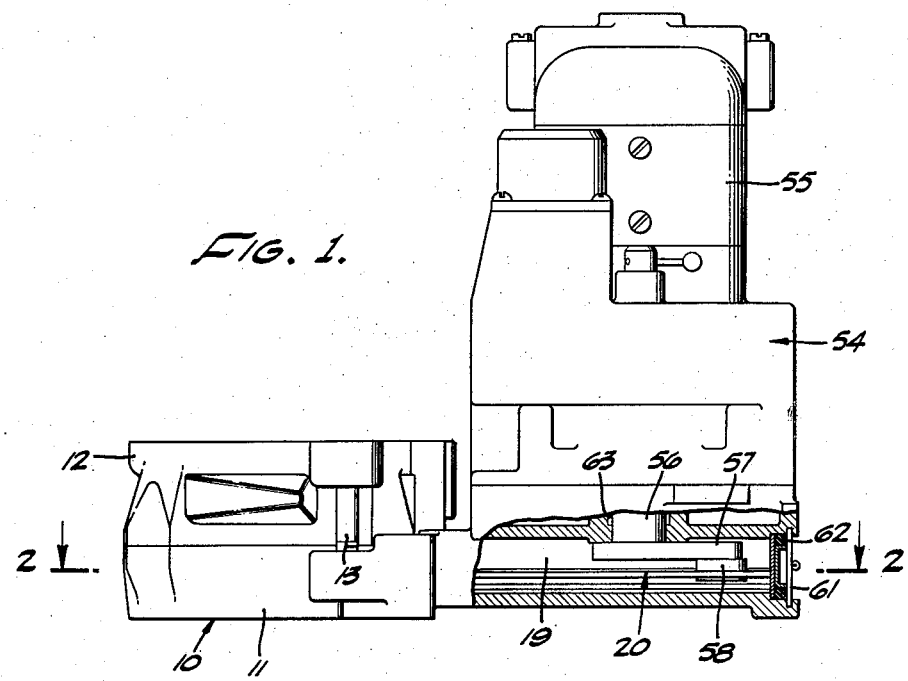
Figure 1 is a side elevation partly broken away showing a preferred embodiment of this invention.

Referring to the drawings:

The housing generally designated 10, includes a body 11 and a cap 12. Threaded fastenings 13 clamp the cap 12 to the body 11. A seal ring 14 prevents leakage at the joint between the cap and the body.

Figure 6:
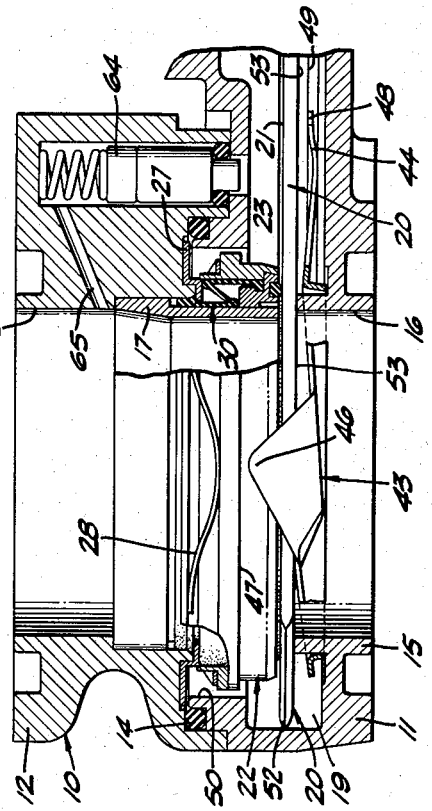
Figure 6 is a view similar to Figure 5 showing the position of the parts when the gate is in fully closed position.

The body has an inner cylindrical wall 15 defining a discharge conduit 16. The cap is provided with an annular skirt 17 which defines an inlet conduit 18. The conduits 16 and 18 are positioned in alignment. The body walls define a cavity 19 therein and a portion of this cavity extends between a portion of the conduits 18 and 16. A valve plate or gate 20 is arranged to move transversely within the cavity from the open position shown in Figure 3 to the fully closed position shown in Figure 6. In the closed position, the gate is positioned between the conduits 18 and 16.

Figure 7:
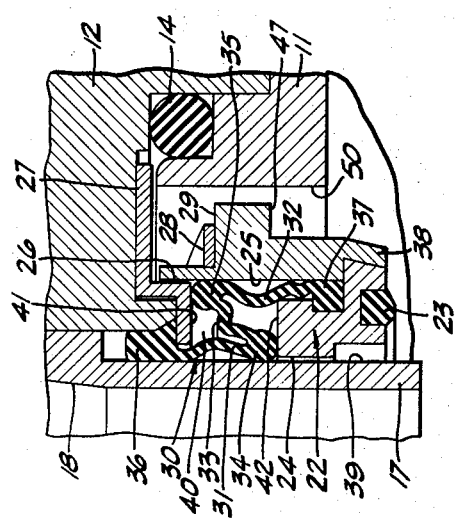
Figure 7 is a sectional detail on an enlarged scale of the seal device shown in Figures 3, 5 and 6.

Means are provided for establishing a fluid-tight seal between the conduit 18 and the upper surface 21 of the gate 20. As shown in the drawings, this means includes an annular carrier 22 encircling the skirt 17 and adapted to move axially along the skirt. A seal ring 23 is mounted on the carrier in position to engage the upper surface 21 of the gate when the gate is in closed position. The carrier 22 has a cylindrical bore 24 having a sliding fit on the outer cylindrical surface of the skirt 17. The carrier also has an internal bore 25 having a sliding fit with the cylindrical surface 26 on the stationary ring 27. A corrugated spring 28 is confined between the loose ring 27 and the annular shoulder 29 on the carrier 22 and this spring 28 acts to move the carrier 22 downward, as shown in Figure 7. The spring 28 constitutes part of the bias means for moving the seal ring 23 into engagement with the gate 20; the bias means also includes pressure responsive means as described below.

Means are provided to prevent leakage between the carrier 22 and the skirt 17 and also to apply a downward force to the carrier as a result of pressure in either of the conduits 18 or 16. As best shown in Figure 7, this means includes a resilient diaphragm member 30. This member is preferably made of synthetic rubber and has concentric annular walls 31 and 32 connected by an integral conical wall 33. The terminal ends of each of the walls 31 and 32 are formed as enlarged beads which are substantially circular in cross section. The lower bead 34 on the wall 31 and the upper bead 35 on the wall 32 are integrally connected by the conical portion 33. The end beads 36 and 37 form static seals with the skirt 17 and carrier 22 respectively.

The carrier 22 may be formed of two parts as shown, permanently connected together for operation as a single integral unit by rolling over the lip 38. This two-part construction facilitates installation of the bead 37 on the carrier 22. When fluid pressure exists in the conduit 18, the fluid under pressure may pass from the lower end of the skirt 17 through the clearance between the surfaces 39 and 24 and into the annular space 40 bounded by the surfaces 25, 39, 41, and 42. The pressure under the conical portion 33 is effective to crowd the bead 35 into the corner defined by the surfaces 25 and 41 and the pressure under the diaphragm then acts downward on the carrier 22 to supplement the action of the corrugated spring 28 in urging the seal ring 23 into engagement with the valve plate or gate 20. When pressure exists in the conduit 16 it passes into the cavity 19 and enters the annular space 40 by way of the clearance between the surfaces 25 and 26. This pressure acts above the conical portion 33 and serves to wedge the bead 34 into the corner between the surfaces 39 and 42. This pressure therefore acts to move the carrier 22 and seal ring 23 downward to supplement the action of the corrugated spring 28. From this description it will be understood that pressure in either of the conduits 18 or 16 is effective to supplement the action of the corrugated spring 28 in moving the carrier 22 and seal ring 23 in a direction to form a fluid-tight seal of the upper side 21 of the gate 20.

Figure 5:
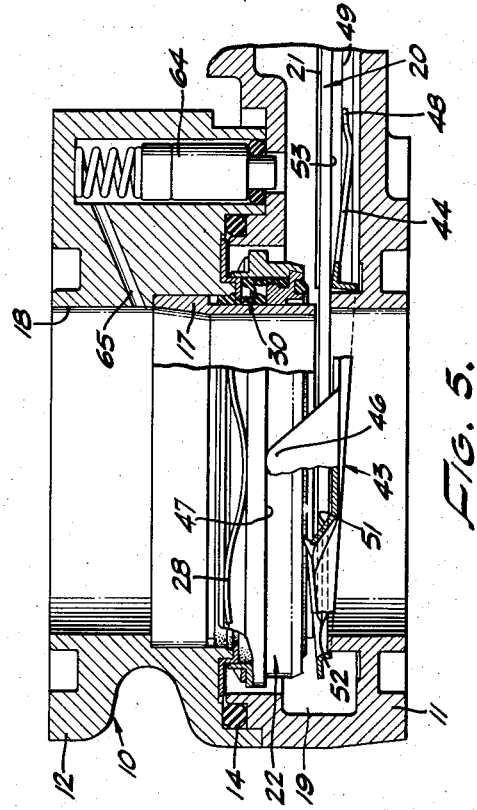
Figure 5 is a view similar to Figure 3 showing the position of the parts when the gate is about midway in its travel toward closed position.

Means are provided to maintain the carrier 22 and seal ring 23 in retracted position when the gate is in open position as shown in Figure 3. This means includes the lift member 43 which is generally annular in shape and which is provided with outwardly projecting resilient feet 44. The central opening 45 in this member 43 is large enough to receive the outer end of the cylindrical wall 15 on the body 11. A pair of axially extending projections 46 are provided on this lift member and the spacing between them is sufficiently great to permit the gate 20 to slide between them. The upper ends of these projections 46 contact the annular shoulder 47 on the carrier 22. The feet 44 have tabs 48 which project laterally into parallel slots 49 provided on the body 11. The proportions of the lift member 43 are such that it may be initially installed in position by inserting it through the body bore 50 before the cap 12 and its associated mechanism are in position. The member 43 is provided with inclined surfaces 51 adjacent the projections 46. When the chamfered forward end 52 of the gate 20 engages these inclined surfaces 51 the lift member is moved downward from the position shown in Figure 5 to the position shown in Figure 6. The lower surface 53 of the gate 20 rides on these inclined portions 51 to maintain the lift member in the inoperative position shown in Fig. 6. In this position the seal assembly including the carrier 22 and seal ring 23 moves downward into sealing contact with the upper surface 21 of the gate 20. The lower surface 53 of the gate 20 also rests on the upper end of the circular wall 15.

When the gate 20 is retracted from closed position, the seal ring 23 remains in scrubbing contact therewith until the curved chamfered end 52 rides down the inclined surfaces 51 and the lift member 43. The lift member is then caused to move upward by the resilience of the feet 44 so that the projections 46 engage under the shoulder 47 to lift the carrier and seal ring 23 away from the upper surface 21 of the gate 20.

Figure 2:
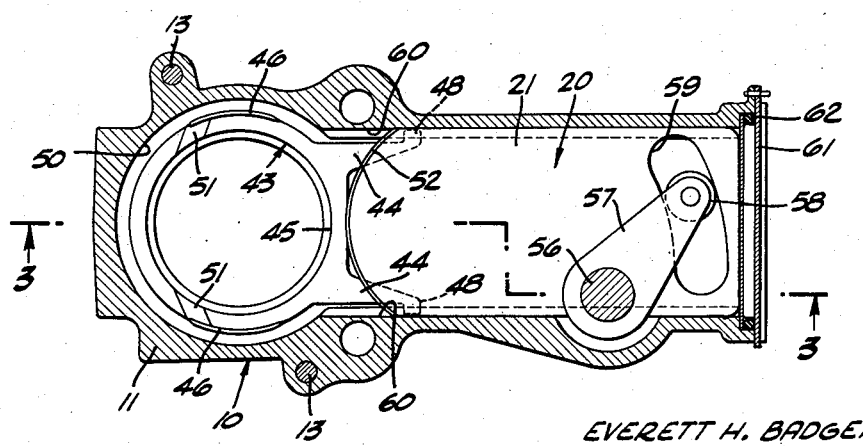
Figure 2 is a sectional plan view taken substantially on the lines 2—2 as shown in Figure 1.

Any convenient means may be provided for moving the gate 20 to and from closed position. As shown in the drawings, the actuator assembly 54 includes an electric motor 55 driving through suitable reduction gearing, not shown, to turn the shaft 56. A crank arm 57 fixed on the shaft 56 carries a roller 58 at its swinging end. This roller is received within a cam slot 59 formed in the gate 20. As viewed in Figure 2, counterclockwise movement of the crank arm 57 is effective to shift the gate 20 to the left toward closed position. The parallel side edges of the gate 20 are guided in parallel slots 60 formed in the body 11. Suitable connections, not shown, are provided to cause the motor to turn in either direction as required so that the gate 20 may be opened or closed. A static seal assembly including the plate 61 and seal ring 62 serve to close the outer end of the body cavity 19. Suitable seal means 63 prevents leakage from the cavity at the point where the shaft 56 extends into it. A thermal relief valve 64 of conventional design is mounted in a passage 65 which communicates between the inlet conduit 18 and the body cavity 19.

Having fully described our invention, it is to be understood that we do not wish to be limited to the details herein set forth but our invention is of the full scope of the appended claims.

We claim:

1. In a gate valve, the combination of: a housing having aligned flow conduits, a gate movable transversely within the housing to a closed position between said flow conduits, seal means encircling one of said conduits and movable axially with respect thereto into engagement with the gate, said means including an annular carrier having a seal ring thereon for contacting the gate, the carrier and the housing having spaced radial shoulders and having concentric cylindrical wall surfaces cooperating to define an annular chamber, a resilient diaphragm element having a first cylindrical portion establishing a static seal with the housing and a second cylindrical portion establishing a static seal with the carrier, a conical portion within the chamber integrally joining the said other portions, the junction between the conical portion and said first portion comprising a bead in the chamber positioned adjacent the corner defined between the cylindrical wall surface on the housing and the radial shoulder on the carrier, and the junction between the conical portion and said second portion comprising a bead in the chamber positioned adjacent the corner defined between the cylindrical wall surface on the carrier and the radial shoulder on the housing.

2. In a valve device of the class described, the combination of: inner and outer concentric annular members capable of relative axial movement, the members having spaced shoulders and having cylindrical wall surfaces cooperating to define an annular chamber, a resilient diaphragm element having a first portion establishing a static seal adjacent the corner in said chamber defined by the wall surface on the inner member and the shoulder on the inner member and a second portion establishing a static seal adjacent the corner in said chamber defined by the wall surface on the outer member and the shoulder on the outer member, a third portion within the chamber integrally joining the said first and second portions, the junction between the third portion and said first portion comprising a bead in the chamber positioned adjacent the corner defined between the wall surface on the inner member and the shoulder on the outer member, and the junction between said third portion and said second portion comprising a bead in the chamber positioned adjacent the corner defined between the wall surface on the outer member and the shoulder on the inner member.

3. In a valve device of the class described, the combination of: inner and outer concentric annular members capable of relative axial movement, the members having spaced radial shoulders and having concentric cylindrical wall surfaces cooperating to define an annular chamber, a resilient diaphragm element having a first portion establishing a static seal adjacent the corner in said chamber defined by the wall surface on the inner member and the shoulder on the inner member and a second portion establishing a static seal adjacent the corner in said chamber defined by the wall surface on the outer member and the shoulder on the outer member, a third portion within the chamber integrally joining the said first and second portions, the junction between the third portion and said first portion comprising a bead in the chamber positioned adjacent the corner defined between the cylindrical wall surface on the inner member and the radial shoulder on the outer member, and the junction between the third portion and said second portion comprising a bead in the chamber positioned adjacent the corner defined between the cylindrical wall surface on the outer member and the radial shoulder on the inner member.

4. In a valve device of the class described, the combination of: inner and outer concentric annular members capable of relative axial movement, the members having spaced radial shoulders and having concentric cylindrical wall surfaces cooperating to define an annular chamber, a resilient diaphragm element having a first cylindrical portion establishing a static seal adjacent the corner in said chamber defined by the wall surface on the inner member and the shoulder on the inner member and a second cylindrical portion establishing a static seal adjacent the corner in said chamber defined by the wall surface on the outer member and the shoulder on the outer member, a conical portion within the chamber integrally joining the said other portions, the junction between the conical portion and said first portion comprising a bead in the chamber positioned adjacent the corned defined between the cylindrical wall surface on the inner member and the radial shoulder on the outer member, and the junction between the conical portion and said second portion comprising a bead in the chamber positioned adjacent the corner defined between the cylindrical wall surface on the outer member and the radial shoulder on the inner member.

References Cited in the file of this patent

UNITED STATES PATENTS

| | | |
|---|---|---|
| 356,997 | Gil | Feb. 1, 1887 |
| 2,390,201 | Bredenbeck | Dec. 4, 1945 |
| 2,603,449 | Overholser | July 15, 1952 |
| 2,701,117 | Bashark | Feb. 1, 1955 |
| 2,718,372 | Broz | Sept. 20, 1955 |
| 2,732,170 | Shand | Jan. 22, 1956 |

FOREIGN PATENTS

| | | |
|---|---|---|
| 669,933 | Great Britain | Apr. 9, 1952 |